United States Patent [19]

Dalziel

[11] Patent Number: 4,725,904

[45] Date of Patent: Feb. 16, 1988

[54] MAGNETIC DISK MEMORY APPARATUS WITH IMPROVED CONTAMINATION CONTROL

[75] Inventor: Warren L. Dalziel, Monte Sereno, Calif.

[73] Assignee: Tandon Corporation, Chatsworth, Calif.

[21] Appl. No.: 308,277

[22] Filed: Oct. 5, 1981

[51] Int. Cl.[4] .................. G11B 5/012; G11B 33/14; G11B 5/48

[52] U.S. Cl. .................................. 360/97; 360/106

[58] Field of Search ............... 360/97, 98, 99, 133, 360/78, 135, 102–106, 109; 346/137; 206/444

[56] References Cited

U.S. PATENT DOCUMENTS

| | | | |
|---|---|---|---|
| 3,631,423 | 12/1971 | Groom | 340/174.1 E |
| 3,710,540 | 1/1973 | Stansell | 55/473 |
| 3,731,291 | 5/1973 | Walsh | 340/174.1 E |
| 3,825,951 | 7/1974 | Katsumeri et al. | 360/133 |
| 3,849,800 | 11/1974 | Cuzner et al. | 360/97 |
| 3,912,278 | 10/1975 | Teutsch | 360/99 |
| 4,008,492 | 2/1977 | Elsing | 360/98 |
| 4,054,931 | 10/1977 | Bolton et al. | 360/97 |
| 4,130,845 | 12/1978 | Kulma | 360/97 |
| 4,185,308 | 1/1980 | Fujioka | 360/97 |
| 4,249,221 | 2/1981 | Cox et al. | 360/97 |
| 4,280,155 | 7/1981 | Scott et al. | 360/98 |
| 4,282,554 | 8/1981 | Ho et al. | 360/97 |
| 4,292,656 | 9/1981 | Fujioka | 360/133 |
| 4,317,146 | 2/1982 | Gervais | 360/98 |
| 4,323,939 | 4/1982 | Iftikar et al. | 360/106 |
| 4,337,491 | 6/1982 | Hasler | 360/97 |
| 4,339,777 | 7/1982 | Gruczelak | 360/97 |
| 4,369,475 | 1/1983 | Ho | 360/97 |

OTHER PUBLICATIONS

Charlton, "Disk Pack Air Pump", IBM Technical Disclosure Bulletin, vol. 11, No. 8, Jan. 1969, p. 951.

Primary Examiner—Stuart N. Hecker
Assistant Examiner—Benjamin E. Urcia
Attorney, Agent, or Firm—Bogucki, Scherlacher, Mok & Roth

[57] ABSTRACT

A "Winchester" type magnetic disk memory apparatus is disclosed that includes an air recirculation system in the clean chamber that assures positive pressure at all points of potential leakage. In conjunction with that feature, the head assembly positioning mechanism is located outside the clean chamber to provide substantial improvements in contamination control. Significant advantages in the manufacture and maintenance of the apparatus also result.

15 Claims, 8 Drawing Figures

MAGNETIC DISK MEMORY APPARATUS WITH IMPROVED CONTAMINATION CONTROL

BACKGROUND OF THE INVENTION

1. Field of the Invention

This invention relates generally to magnetic data storage devices, and more particularly to storage devices of the type commonly known as "Winchester" disk memories.

2. Description of the Prior Art

In the digital data storage devices known generically as "Winchester" disk memories, one or more rigid, rotatable magnetic disks and their associated magnetic head assemblies are sealed within a "clean chamber" in which air is continuously recirculated and filtered to exclude contaminants such as smoke and dust particles larger than about 0.3 micron. To prevent contamination during manufacture, final assembly of the drives and sealing of the clean chamber take place in a "clean room".

It is known that it is desirable to maintain the clean chamber at a positive pressure (see, for example, U.S. Pat. No. 3,740,735); in practice, however, this is not always achieved throughout the chamber. Where subatmospheric pressures exist—for example, in the areas about drive shafts that project through the clean chamber wall—points of potential leakage are created and contaminants, including particles dislodged from shaft bearings, can be drawn into the clean chamber. Often, this is particularly a problem in the vicinity of the disk drive motor spindle which, because of its location at the center of the rotating disk, is inherently at a low pressure point. The addition of impeller blades or vanes on the disk spindle for propelling the circulating air and assuring an adequate flow rate through the recirculating filter (which typically imposes a substantial pressure drop), often aggravates the problem by further decreasing the pressure in the vicinity of the spindle.

Another potential source of contamination in prior art Winchester drives is the head assembly positioning mechanism. These positioners may take various forms including, for example, split-band drives of the type disclosed in U.S. Pat. Nos. 4,161,004 and 4,164,769 or linear positioners using bearings and ways, for example, U.S. Pat. No. 3,665,433. Many of the elements of these positioners, including the band and the drive capstan about which the band is wrapped, and/or the bearings and ways, are enclosed within the clean chamber. At the band/capstan and bearing/way interfaces, small amplitude, repetitive motion occurs. This relatively high frequency motion with concomittant small amplitude slippage, causes a type of wear known as fretting wear or fretting corrosion. Also, all bearings in the system contain lubricants with volatile components. As a result, because of corrosion, wear, evaporation and so forth, those elements may produce a variety of contaminants that are entrained or swept up by the air flow and transported to the head/disk area.

SUMMARY OF THE INVENTION

In the disk drive apparatus of the present invention there is provided an air recirculation flow within the clean chamber that assures positive pressure at all points of potential leakage including, but not limited to, the area immediately surrounding the disk drive spindle. Thus, any leakage that exists causes flow out of the clean chamber and not into it; contaminants dislodged from bearing surfaces, for example, are swept out of the chamber and not vice versa. Consequently, the spindle motor can be installed metal-to-metal without expensive gaskets and other sealing expedients. In conjunction with the foregoing, the head assembly positioning mechanism is located in its entirety outside the clean chamber so as to eliminate those elements as sources of contamination. The placement of all of the positioning mechanism components outside the clean chamber moreover results in significant manufacturing and maintenance advantages including the ability to assemble and repair the mechanism outside a clean room, the elimination of sealed bearings or other seals about the step motor shaft and the ability to machine all critical surfaces from one side of the housing defining the clean chamber with substantial attendant reductions in fabrication costs.

It is thus an overall object of the present invention to provide an improved magnetic disk memory of the "Winchester" type.

More specifically, it is an object of this invention to improve the control of contamination in the clean chamber of a "Winchester" type magnetic disk memory and to thereby reduce contamination to levels not heretofore attainable.

DESCRIPTION OF THE DRAWINGS

The foregoing, as well as other objects and advantages of the invention, will be understood by referring to the detailed description of the preferred embodiment in conjunction with the appended drawings in which.

DESCRIPTION OF THE PREFERRED EMBODIMENT

Figure 1:
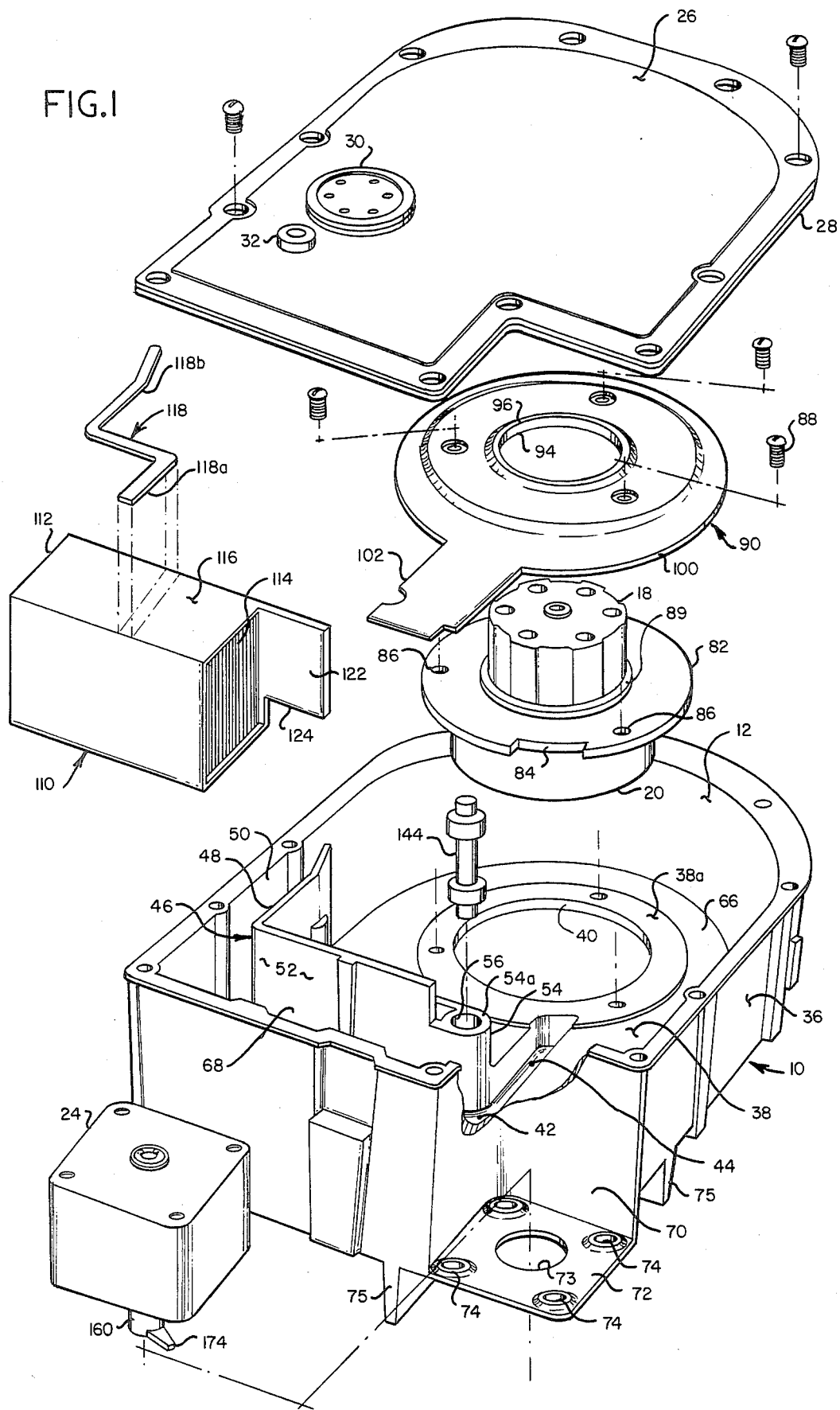
FIG. 1 is an exploded, perspective view of portions of the magnetic disk drive of the present invention.

With reference to the accompanying drawings, there is shown a specific, preferred embodiment of the magnetic disk drive of the present invention including, generally, a housing 10 defining a clean chamber 12 configured to enclose one or more rotatable magnetic disks 14 and their associated head assemblies 16. The disks 14 are carried by a spindle 18 driven by a motor 20, while the head assemblies 16 are actuated relative to the disks by a head assembly positioning mechanism 22 that includes a step motor 24. The clean chamber is sealed by a cover plate 26 in conjunction with a peripheral gasket 28. The cover plate 26 includes a breather filter 30 and sample port 32.

The housing 10 is an integrally cast structure having a side wall 36 a portion of which has a cylindrical configuration that closely conforms to the periphery of the magnetic disks 14. The housing also has a bottom wall 38 including a circular opening 40 concentric with the curved end of the housing for receiving the spindle motor 20 and a generally rectangular depression or pocket 42 at the other end of the housing. The bottom wall 38 has an upper surface including a machined boss 38a circumscribing the opening 40, and a lower (or outside) surface. Also formed in the bottom wall 38 is a channel or duct 44 that leads from the pocket 42 to a point adjacent the motor opening 40.

The housing 10 further includes a generally L-shaped baffle 46, one leg 48 of which extends longitudinally and defines, in conjunction with the side wall 36, an air passage 50 for conducting air centrifuged from the magnetic disks to the vicinity of the pocket 42. The baffle 46 is the same height as the side wall 36.

The other leg 52 of the baffle 46 extends in a transverse direction along the edge of the pocket 42 and terminates at a boss 54 adjoining the duct 44. The boss 54 has a vertical bore 56 extending through the bottom wall and through a boss 58 depending from the lower surface of the bottom wall. The height of the boss 54 is somewhat less than half the height of the side wall 36. A low, transverse wall 60 having approximately the same height as the boss 54 parallels the leg 52 of the baffle 46 and extends between the boss 54 and the longitudinal baffle leg 48 thus defining a well 62. An elongated aperture 64 in the bottom of the well serves as an exit for the head assembly wires. The baffle 46 generally divides the clean chamber 12 into a disk compartment 66 and a filter compartment 68.

Figure 4:
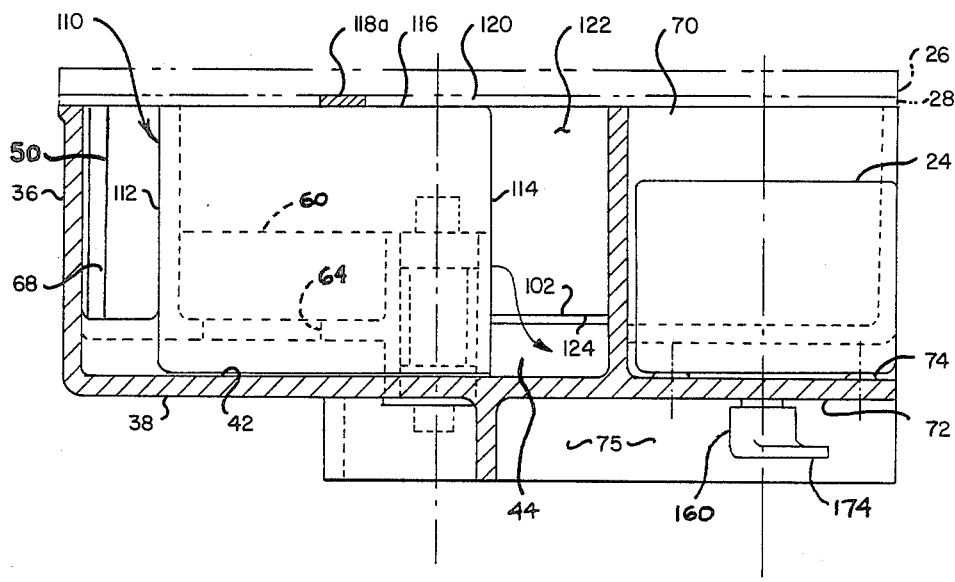
FIG. 4 is an end elevation view, partly in section, as seen along 4—4 in FIG. 2.
Figure 5:
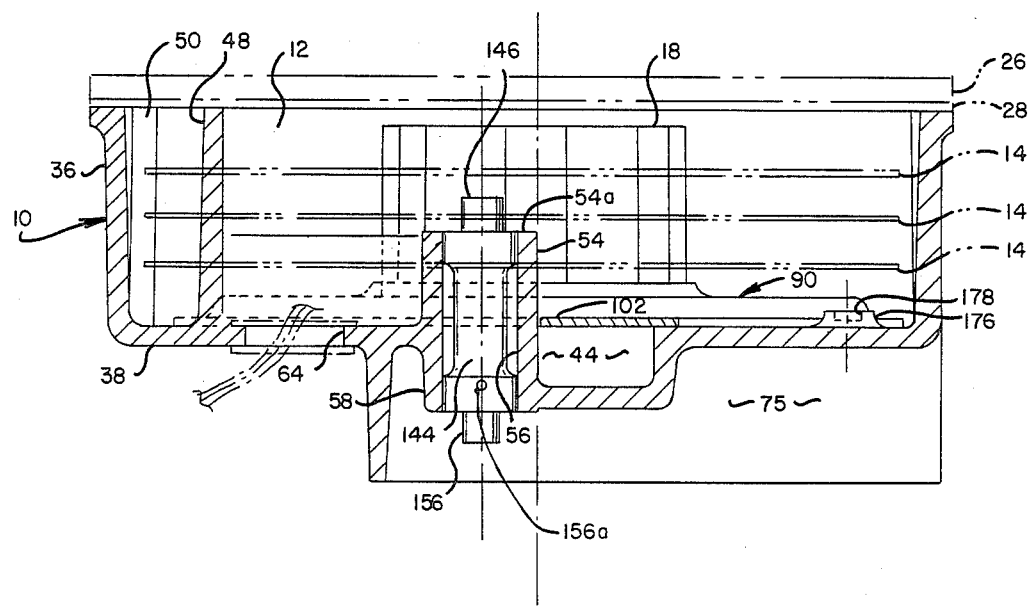
FIG. 5 is an end elevation view, partly in section, as seen along 5—5 in FIG. 2.

It will also be seen that a corner of the side wall 36 is recessed at 70 to accommodate the step motor 24. As best shown in FIG. 4, the portion 72 of the bottom wall within the recess 70 is in alignment with and may be viewed as an extension of the bottom of the pocket 42. The wall portion 72 has a central opening 73 through which the motor shaft projects. The upper surface of the bottom wall portion 72 furthermore has precision-machined bosses 74 for supporting the step motor and precisely locating it relative to other machined surfaces including the top surface 54a of the boss 54 which locates the height of the head assembly and the surface 38a of the bottom wall circumscribing the opening 40 which in similar fashion locates the spindle motor 20.

Figure 6:
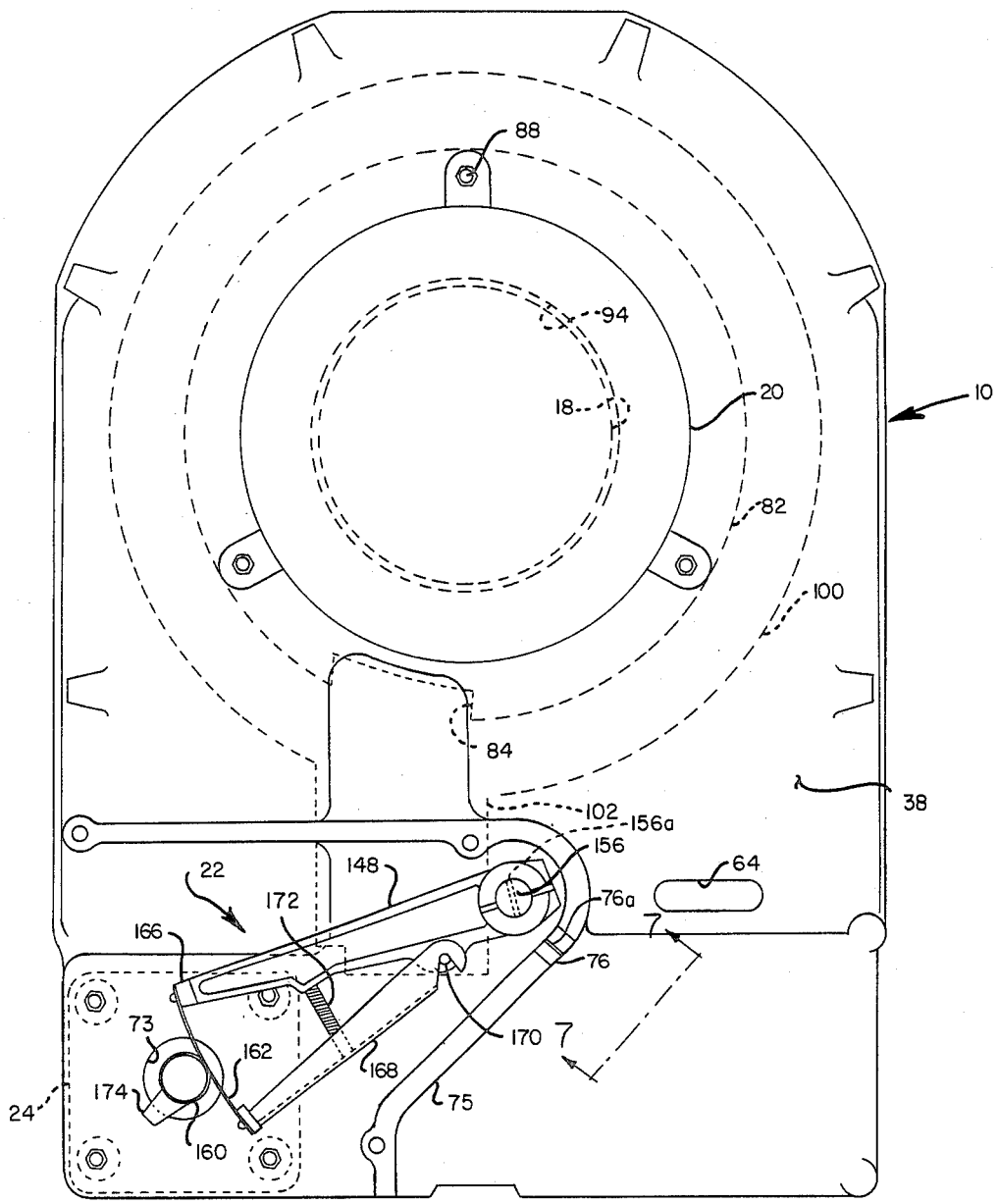
FIG. 6 is a bottom view of the disk drive showing the placement and orientation of the head assembly positioning mechanism.
Figure 7:
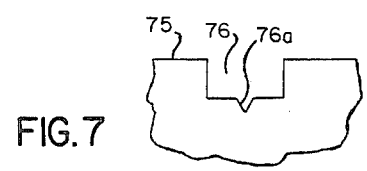
FIG. 7 is a view of a portion of the disk drive as seen along 7—7 in FIG. 6.
Figure 8:
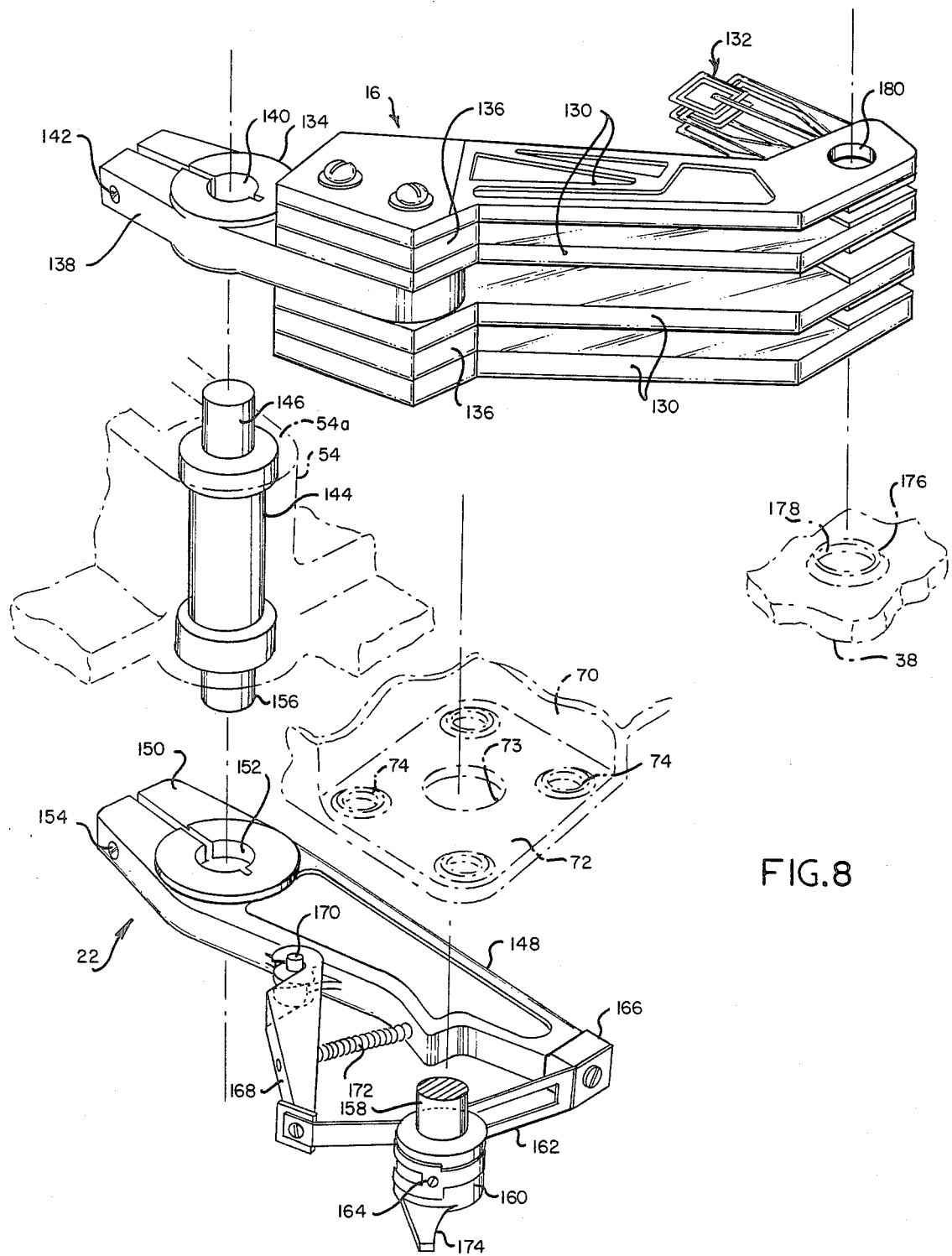
FIG. 8 is an exploded, perspective view showing details of the head assembly positioning mechanism.

Last, the housing 10 includes a depending wall 75 shaped, as best illustrated in FIG. 6, to partly circumscribe and thereby protect the head assembly positioning mechanism 22. The wall 75 has a cutout 76 to provide access to the mechanism 22 as will be presently described.

The casing of the spindle motor 20 has a mounting flange 82 that engages the machined surface 38a about the opening 40 and has a cutout 84 positioned to line up with the duct 44. The flange also has holes 86 for receiving threaded fasteners 88 for securing the motor flange to the bottom wall.

The spindle 18 projects upwardly into the clean chamber and is appropriately configured to securely carry the magnetic disks 14, all in accordance with practices well known in the art. The spindle includes, near its lower extremity, a flange 89 having an outer, cylindrical surface.

Figure 3:
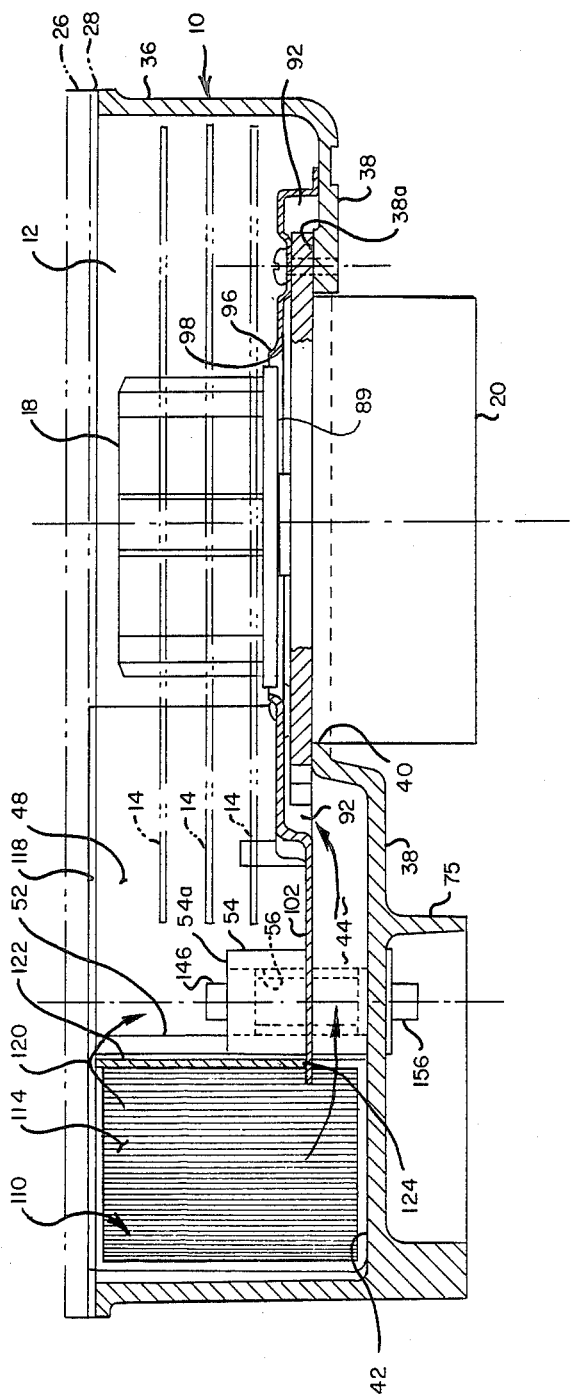
FIG. 3 is a side elevation view, partly in section, as seen along 3—3 in FIG. 2.

Overlying the spindle motor mounting flange 82 is a shroud 90 preferably fabricated of high permeability material to shield the heads from electromagnetic interference generated by the spindle motor. The shroud includes a shallow, annular plenum 92 circumscribing the lower extremity of the spindle 18, that is, the portion of the spindle that is proximate the motor bearing (not shown) carrying the spindle. The spindle projects through a central opening 94 in the shroud, that opening being defined by an upturned lip or edge 96 that defines a gap 98 (best seen in FIG. 3) of predetermined size about the outer surface of the spindle flange 89. The gap 98 is dimensioned to control air flow from the duct into the disk compartment 66 and to control the pressure in the vicinity of the spindle bearing. The shroud further includes a peripheral flange 100 having a generally rectangular extension or tongue 102 covering the duct 44. The outer end of the tongue 102 extends slightly past the edge of the pocket 42. The shroud is conveniently held in place by the motor mounting fasteners 88.

A recirculating air filter 110 having a generally rectangular, box-like configuration, is disposed in the filter compartment 68 and seated in the pocket 42 between the side wall 36 and the transverse baffle leg 52. The filter 110 has an inlet 112 communicating with the passage 50 and an outlet 114 in communication with the duct 44 and contains a filter element (of commercially available material) capable of removing particles down to 0.3 microns in size. The top surface 116 of the filter is flush with the upper edges of the side wall 36.

Sandwiched between the top surface of the filter and the cover plate is a narrow gasket 118 having a first part 118a extending the width of the filter and a second part 118b that lies along the upper edge and follows the L-shaped baffle 46. It will be evident that a small gap 120 is thus defined between the part of the top surface of the filter to the right of the gasket leg 118a and the clean chamber cover plate 26.

The side of the filter 110 adjacent the baffle leg 52 has a rectangular extension or baffle plate 122 positioned and dimensioned to block substantially all air flow from the filter outlet 114 to the disk compartment 66 save that entering the duct 44 and that flowing over the top of the filter via the gap 120. In this connection, the extension 122 does not extend the full height of the filter, but terminates at a lower edge 124 abutting the shroud tongue 102.

The head assembly 16 comprises a series of four, stacked arms 130 carrying six identical flying head structures 132 that cooperate with both faces of the three disks 14 in a manner well known in the art. The arms 130 are rigidly fastened to an arm support 134 which carries the arms in cantilever fashion. The arms 130 are spaced apart in the vertical direction by the support 134 and spacers 136. The support 134 further has a split end 138 having a hole 140 and a clamping screw 142.

An arm shaft 144, carried by the bore 56, has an upper end 146 received by the hole 140 in the arm support 134. After alignment (described subsequently), screw 142 securely clamps the split end of the support 134 to the shaft end 146.

The head positioning mechanism 22 includes a head actuator arm 148 disposed outside the clean chamber below the bottom wall 38. The arm 148 has a split end 150, an opening 152 and a clamping screw 154 for attaching the actuator arm to a lower end 156 of the arm shaft 144 after alignment. It will thus be seen that angular displacements of the actuator arm are translated into proportional displacements of the head assembly 16 to provide access to the information stored along the various tracks on the faces of the disks 14.

The step motor 24 has a depending shaft 158 carrying a capstan 160 about which is wrapped a flexible, substantially non-stretchable split band 162 secured to the capstan by a fastener 164. It will be seen, for example, in FIGS. 4 and 6, that the step motor shaft extends through the opening 73 so that the capstan is disposed below the bottom wall. The band 162 has one end attached to the outer end 166 of the actuator arm 148 while the other end of the band is secured to a band-tensioning link 168 pivotally mounted on the actuator arm 148 at the point 170 and biased away from the arm 148 by a compression spring 172. The capstan has at its lower extremity a flag 174 which, as is known in the art, is adapted to cooperate with an optical reference track detector (not shown).

The lower end 156 of the free rotating arm shaft 144 has a small through-hole 156a. For initial alignment, one end of a close fitting, straight, resilient pin or wire (not shown) is inserted into hole 156a while the other end is allowed to rest in a small V-shaped notch 76a formed in the cutout 76. The slight difference in elevation of the hole 156a and the notch 76a causes the resilient pin to deflect slightly and hence to be urged into and secured by V-notch 76a. Thus the position of the arm shaft 144 is thereby temporarily fixed relative to the housing 10. The upper surface of the bottom wall 38 has a circular boss 176 provided with a blind reference hole 178 machined therein that is used to initially align the head arm assembly 16 during manufacture of the drive. The arm assembly 16 is placed on the upper end 142 of arm shaft 144 and the arm assembly 16 is rotated until a precision pin (not shown) passes through a series of aligned holes 180 in the outer ends of the arms 130 and into the reference hole 178. Tightening the screw 142 secures the arm assembly 16 to the previously second shaft 144 thereby holding the arm assembly 16 in a fixed position relative to the housing 10 even after the alignment pin is withdrawn from holes 180. Arm assembly 16 is typically the last component installed in the disk compartment 66; therefore, cover 26 can be installed and all subsequent assembly performed outside of a "clean room". This is significant because "clean room" space is expensive and all components brought into the clean room must be thoroughly cleaned at additional expense. Next, actuator arm 148 is placed on the lower end 156 of arm shaft 144. Capstan 160 is rotated to the alignment position and held in place by energizing the appropriate phase of the step motor 24. After attaching the band 162 to the capstan 160. arm 148 and link 168, as described previously, screw 154 is tightened clamping the arm 148 to the arm shaft 144. The pin can now be removed from the hole 156a leaving both the head arm assembly 16 and the actuator arm 148 precisely aligned with the motor 24 and the housing 10. Thus, incremental displacements of the step motor shaft 158 result in corresponding step-wise movements of the heads along opposing surfaces of the disks 14 starting from a predetermined reference track established by the alignment procedure. Repair and/or replacement of parts is also facilitated since hole 156a and notch 176a are outside the sealed chamber 12 of the drive.

During operation of the disk drive, air centrifuged off the disks 14 enters the passage 50 and flows into the filter compartment 68 and through the recirculation filter 110. Most of the air exiting the filter flows under the baffle plate 122 and enters the duct 44 while the remainder flows through the gap 120 above the filter into the vicinity of arm shaft 144 and well 62. From the duct 44, the air flows into the plenum 92 and out into the disk compartment 66 through the gap 98 between the spindle 18 and the lip 96 of the shroud. The gap 98 is dimensioned to control the flow rate out of the plenum 92 and results in the maintenance of a pressure slightly above ambient at least about the lower portion of the spindle within the confines of the plenum 92. In a similar fashion, the small air flow over the top of the filter into the region of the arm shaft 144 and well 62 elevates the pressure at those points and at the wire exit 64 to a small positive level. With the present design, the remaining points of potential leakage—around the cover plate gasket 28—are also maintained at positive pressure.

As stated, no vanes or impellers are used to boost the pressure of the air, the disks themselves being the sole source of circulation energy. In this connection, a large volume, low back pressure recirculation filter is employed to obtain a higher recirculation rate. In accordance with one practical example, the recirculation filter has a volume of about five cubic inches and a pressure drop across it of no more than about 1/10 of an inch of water, these quantities resulting in a recirculation rate of about eight passes per minute. In essence, by utilizing a filter having an efficiency somewhat less than an "absolute" filter (about 97% vs. 99.97%), a higher recirculation rate is established; the tradeoff is such that contamination removal is optimized.

It will also be seen that the head assemblies 16 are located downstream of the point at which filtered air reenters the disk compartment 66 through the gap 120, so that their location is at a point where the air is likely to be least contaminated, and also well away from regions of greatest air turbulence which exist where air discharges from the gap 120 and about the entrance to the passage 50.

The design of the air recirculation system is such that during operation, air only enters the clean chamber through the breather filter 30 to make up for that lost through leakage. Because such leakage is so small in practice, very little air flows through the breather. When the drive is not operating, changes in atmospheric pressure may cause a small amount of air to enter the clean chamber. If the breather filter is large enough, essentially all of the air enters through the breather filter.

Figure 2:
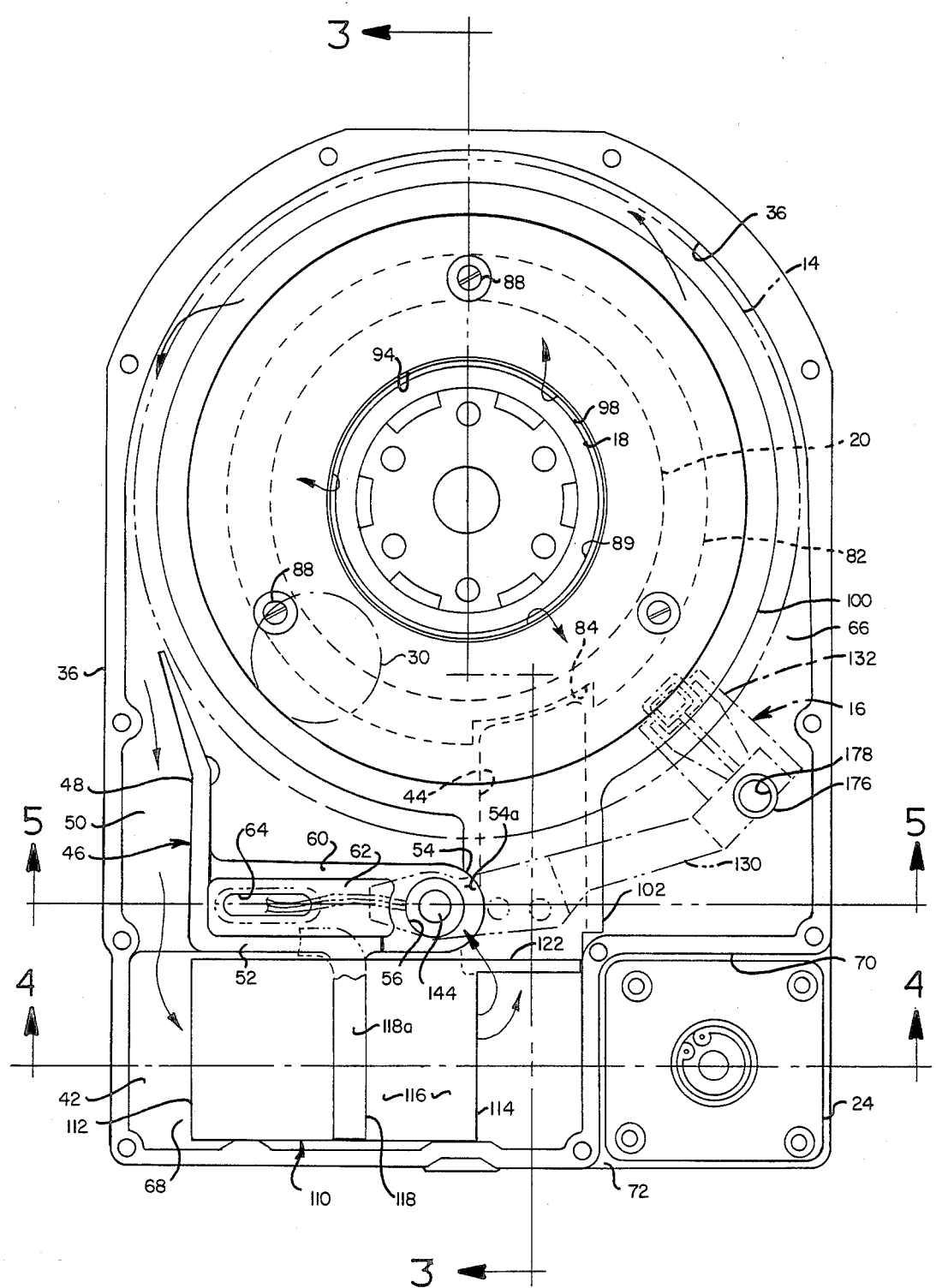
FIG. 2 is a top plan view of the disk drive with the top cover of the clean chamber removed, with certain parts shown in phantom for the sake of clarity and with emphasis on details of the air recirculation, scheme forming part of the present invention.

The breather filter 30 establishes a point at which the pressure in the chamber is essentially equal to atmospheric. Optimally, the breather is best placed at the point of lowest pressure when the disks are in motion. Typically, that point is at the center of the disk pack but the space limitations required breather filter size and other physical constraints of the present system, which has its principal application to 5¼" Winchester drives, are such that the breather cannot be so placed. In the present drive, the breather position—best seen in FIG. 2.—is as close as practicable to the disk center. The air recirculation scheme of the present invention assures that even with the breather filter placed somewhat off the spindle axis, all of the potential leak points mentioned are maintained at positive pressure.

The port 32 is used to test the integrity of the clean chamber seals and verify the efficiency of the breather filter 30 In conducting this leak test, a flow meter is connected to the sample port to determine that flow rates are within prescribed limits.

As already stated, significant manufacturing cost reductions are realized as a result of the present invention because machining of all critical surfaces can be accomplished from one side of the casting. In other words, only a single machining operation set-up is needed. The surfaces whose machining is thus facilitated include the spindle motor hole 40, the spindle motor mounting surface 38a, the boss surface 54a, the arm shaft bore 56, the step motor opening 73, the step motor bosses 74 and the head assembly locating and alignment hole 178.

While the invention has been particularly shown and described with reference to a preferred embodiment, it will be understood by those skilled in the art that various modifications may be made therein and that other embodiments may be employed in practicing the invention. Accordingly, it is intended that the appended claims encompass all such modifications and embodiments as fall within the true spirit and scope of the invention.

What is claimed is:

1. A magnetic disk memory apparatus comprising:
    a sealed housing defining a clean chamber divided into a disk compartment and a filter compartment, the housing having a bottom wall defining a duct connecting the disk and filter compartments, the housing further having a baffle defining a passage connecting said compartments;
    a spindle and drive motor assembly mounted in the bottom wall of the housing, the spindle projecting into the disk compartment and carrying at least one magnetic disk, the spindle further having an annular flange disposed between the disk and the bottom wall, the flange including an outer surface;
    a shroud mounted on the bottom wall of the housing and defining a plenum circumscribing the spindle and communicating with the duct, the shroud including a circular opening defined by an edge, the edge surrounding the outer surface of the spindle flange to define a gap of predetermined size between the edge of the opening and the outer surface of the flange;
    a magnetic head assembly for each disk, the assembly being mounted in the disk compartment for movement relative to the surfaces of the disk;
    a head assembly positioning mechanism coupled to the head assembly for moving the assembly;
    a large volume, low back pressure recirculating air filter seated in the filter compartment, the filter having an inlet communicating with the passage and an outlet communicating with the duct, air centrifuged off the magnetic disk entering the passage and flowing through the filter, through the duct and into the plenum from where it is discharged through the gap at a controlled rate so that the air pressure about the portion of the spindle within the confines of the plenum is maintained above ambient.

2. A magnetic disk memory apparatus, as defined in claim 1, in which:
    the bottom wall of the housing includes a wire exit and a bore;
    the head assembly positioning mechanism includes a head arm shaft rotatably mounted in the bore;
    the sealed housing includes a cover plate;
    the recirculating filter includes an upper surface proximate the cover plate and spaced therefrom;
    and in which
    a baffle plate is positioned adjacent the filter outlet for directing into the duct most of the air exiting from the filter and for directing the remainder of the air to flow through the space between the cover plate and the upper surface of the filter and into the vicinity of the wire exit and arm shaft whereby during operation of the apparatus, the air pressure in the vicinity of the wire exit and about the arm shaft are maintained above ambient.

3. A magnetic disk apparatus, as defined in claim 1, in which the head assembly positioning mechanism includes:
    a pivotable arm shaft extending through a bore in the bottom wall of the housing, the shaft having an inner end projecting into the disk compartment and secured to the magnetic head assembly and an outer end projecting from the housing;
    a step motor having a shaft;
    a capstan affixed to the shaft;
    a flexible, substantially non-stretchable band having opposite ends, said band being wound about and affixed to the capstan;
    a head actuator arm secured to the outer end of the pivotable arm shaft;
    a band tension link pivotally mounted on said actuator arm, the opposite ends of the band being attached to the head actuator arm and tension link, respectively, and maintained under tension thereby, whereby angular displacements of said step motor causes corresponding movements of said magnetic head assembly;
    and in which
    said band, head actuator arm and tension link are all disposed outside of the clean chamber.

4. A magnetic disk memory apparatus, as defined in claim 3 in which:
    the bottom wall of the housing has an upper surface, a lower surface and an extension outside the clean chamber, the step motor being mounted on the upper surface of said wall extension.

5. A magnetic disk apparatus, as defined in claim 3, in which:
    the bottom wall of the housing has an upper surface and a lower surface and an extension outside of the clean chamber, the step motor being mounted on the upper surface of said wall extension;
    and in which
    the capstan, band, head actuator arm and tension link are all disposed outside of the clean chamber and below said lower surface.

6. A magnetic disk apparatus, as defined in claim 1, including:
    a breather filter mounted in the cover plate adjacent the spindle for establishing a reference pressure.

7. A magnetic disk memory apparatus comprising:
    a housing defining a sealed chamber;
    at least one rotatable, magnetic disk enclosed in the chamber;
    means for supporting and rotatably driving the disk;
    a magnetic heat assembly for each disk, the assembly being enclosed in the housing and positionable relative to the faces of the disk;
    means for positioning the head assembly, the positioning means being entirely located outside the housing;
    means coupling the magnetic head assembly and positioning means;
    and wherein:

the coupling means has an inner end and an outer end, the magnetic head assembly being attached to the inner end and the positioning means being attached to the outer end, the outer end including first reference means for initially aligning the coupling means relative to the housing; and the housing includes second reference means within the chamber for initially aligning the magnetic head assembly relative to the housing, whereby installation of the positioning means may be performed outside of a "clean room".

8. A magnetic disk memory apparatus comprising:

a housing defining a sealed chamber;

at least one rotatable, magnetic disk enclosed in the chamber;

means for supporting and rotatably driving the disk;

a magnetic head assembly for each disk, the assembly being enclosed in the housing and positionable relative to the faces of the disk;

means for positioning the head assembly, the positioning means being entirely located outside the housing;

means coupling the magnetic head assembly and positioning means;

and wherein:

the coupling means comprises a pivotable shaft extending through a bore in the wall of the housing and having inner and outer ends;

the magnetic head assembly is secured to the inner end of the shaft;

the positioning means in coupled to the outer end of the shaft; and the positioning means comprises a band drive mechanism.

9. A magnetic disk memory apparatus comprising:

a housing defining a clean chamber divided into a disk compartment and a recirculating filter compartment;

a spindle and motor assembly supporting and adapted to rotatably drive at least one magnetic disk;

means defining a plenum disposed about the spindle, the plenum having a discharge opening circumscribing the spindle;

magnetic head means mounted in the disk compartment for movement relative to the faces of the disk;

means coupled to the magnetic head means for positioning the head means relative to the faces of the disk;

a recirculating filter in the filter compartment, the filter having an inlet and an outlet;

means for guiding air centrifuged from the disk in the disk compartment to the filter inlet; and means for conducting air flow from the filter outlet into the plenum about the spindle, so that during operation of the apparatus air emerges from the plenum via the discharge opening at a controlled rate, maintaining the air pressure about the spindle above ambient.

10. magnetic disk memory apparatus, as defined in claim 9, in which:

the positioning means includes a head actuator and a motor coupled to move the actuator, the motor and actuator being disposed outside the clean chamber.

11. A magnetic disk memory apparatus, as defined in claim 9, in which:

the positioning means is disposed outside the clean chamber and is coupled to the magnetic head means by a shaft extending through the wall of the housing and having an inner portion projecting into the clean chamber;

and which includes:

means for directing a portion of the air discharged from the filter outlet to the vicinity of the inner portion of the shaft whereby during operation of the apparatus, the air pressure in that vicinity is maintained above ambient.

12. A magnetic disk memory apparatus comprising:

a housing having a wall defining a sealed chamber;

rotatable, magnetic disk means enclosed in the chamber;

means for supporting and rotatably driving the disk means;

a magnetic head assembly for the disk means, the magnetic head assembly being enclosed in the chamber and positionable relative to the faces of the disk means;

a head assembly positioning mechanism disposed outside the sealed chamber, the mechanism including a step motor and split-band drive connected to the motor; and a shaft coupling the split-band drive and the magnetic head assembly, the shaft extending through the wall of the housing.

13. A magnetic disk memory apparatus, as defined in claim 12, in which:

the housing includes a bottom wall, the bottom wall having an upper surface, a lower surface and an extension outside of the sealed chamber, the step motor being mounted on the upper surface of the bottom wall extension, the split-band drive being disposed below the lower surface of the bottom wall.

14. A magnetic disk memory apparatus, as defined in claim 12, in which:

the shaft has an inner end and an outer end, the magnetic head assembly being attached to the inner end and the split-band drive being attached to the outer end, the outer end including first reference means for initially aligning the shaft relative to the housing; and the housing includes second reference means within the chamber for initially aligning the magnetic head assembly relative to the housing, whereby installation of the positioning mechanism may be performed outside of a "clean room".

15. A magnetic disk memory apparatus, as defined in claim 12, further including:

an air recirculation system in the chamber, the recirculation system including means for directing a portion of the recirculated air to the vicinity of the shaft for maintaining the pressure of that vicinity above ambient during operation of the apparatus.

* * * * *